Jan. 16, 1962   W. HAMILTON ET AL   3,016,623
TRANSPORT VEHICLE
Filed Nov. 13, 1956   5 Sheets-Sheet 1
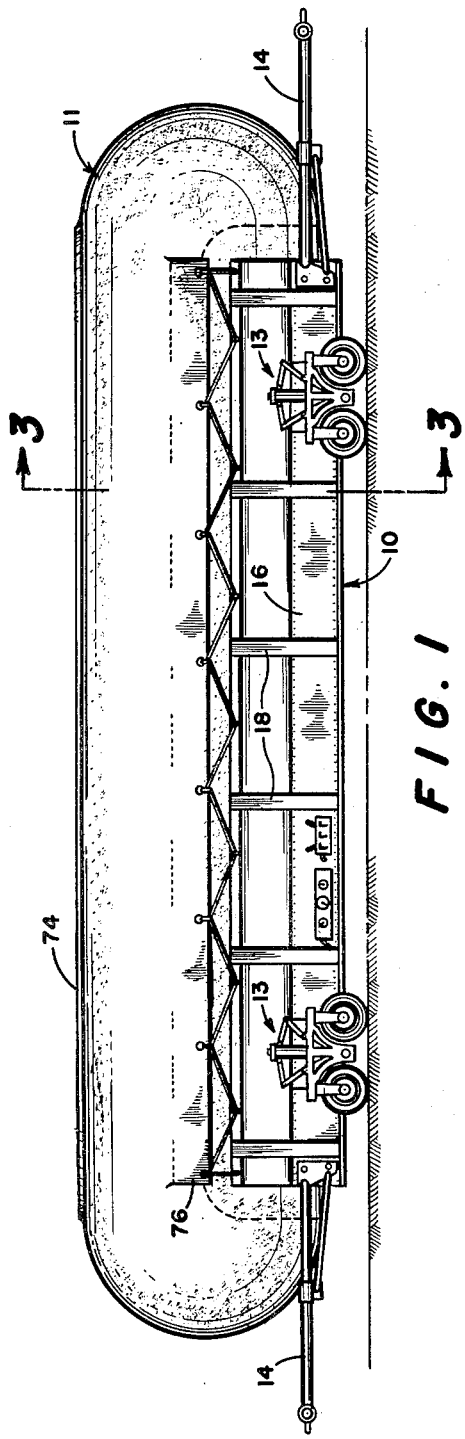
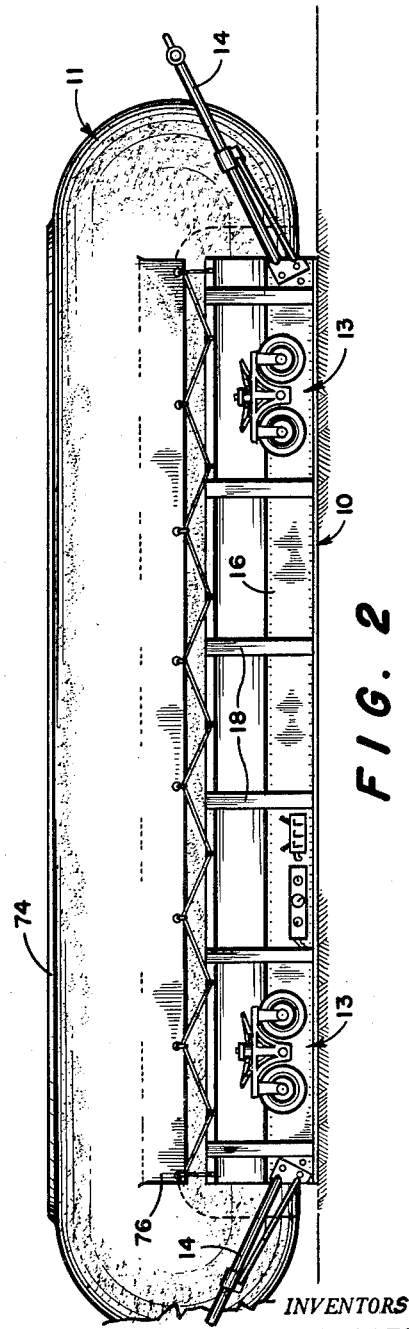
INVENTORS
WALLACE HAMILTON
BY JACK LOVELL
ATTORNEY

INVENTORS
WALLACE HAMILTON
JACK LOVELL
BY
ATTORNEY

Jan. 16, 1962 W. HAMILTON ET AL 3,016,623
TRANSPORT VEHICLE
Filed Nov. 13, 1956 5 Sheets-Sheet 3
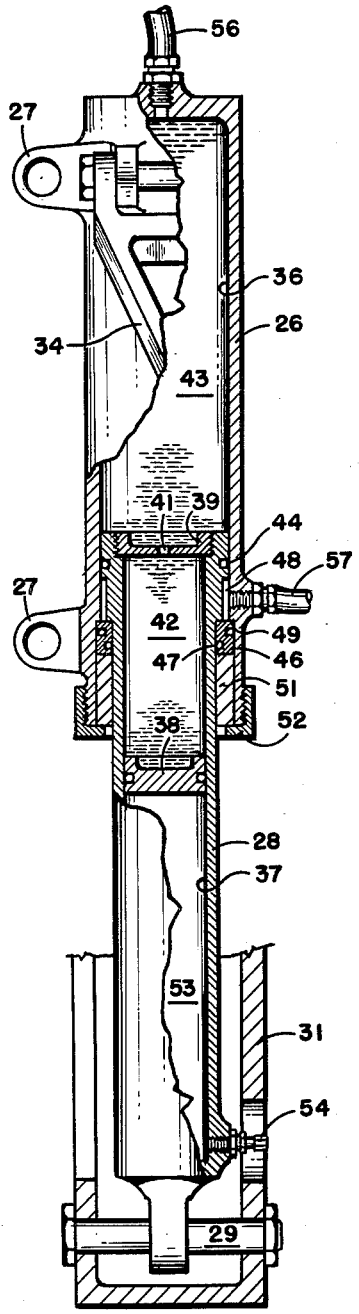
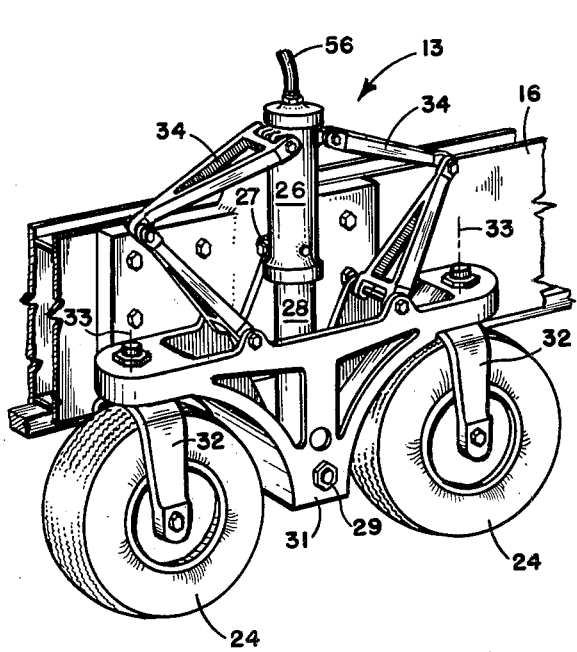
FIG. 5
FIG. 6
INVENTORS
WALLACE HAMILTON
BY JACK LOVELL
ATTORNEY Jan. 16, 1962 W. HAMILTON ET AL 3,016,623
TRANSPORT VEHICLE
Filed Nov. 13, 1956 5 Sheets-Sheet 4

INVENTORS
WALLACE HAMILTON
JACK LOVELL
BY
ATTORNEY

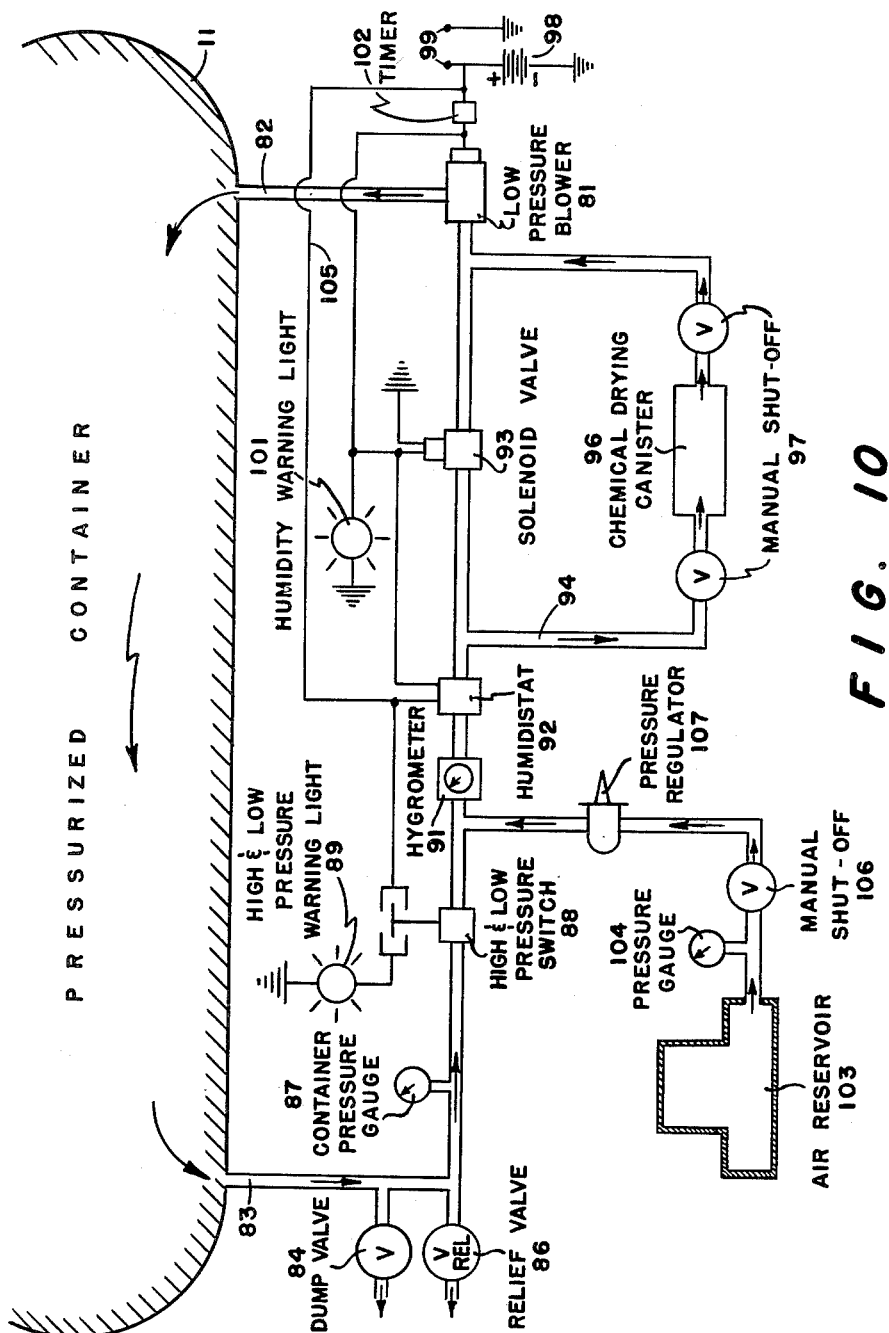

United States Patent Office 3,016,623
Patented Jan. 16, 1962

3,016,623
TRANSPORT VEHICLE
Wallace Hamilton, Bentleyville, and Jack Lovell, Chagrin Falls, Ohio, assignors to Cleveland Pneumatic Industries, Inc., a corporation of Ohio
Filed Nov. 13, 1956, Ser. No. 621,950
1 Claim. (Cl. 34—50)

This invention relates to transport vehicles and more particularly to a vehicle adapted to transport a load from one location to another and in addition provide protective storage for the load so that the load will not deteriorate or be damaged while on the vehicle.

A transport vehicle according to this invention is particularly adapted to be used in conjunction with missiles and other complex military equipment wherein the transport must not only provide protective containment for the missile so that it can be stored for long periods of time, but also enable the transportation of the missile from one location to another by methods including air transportation.

It is an important object of this invention to provide a transport vehicle having means to enclose a load in combination with means to maintain a controlled atmosphere around the load.

It is another important object of this invention to provide a transport vehicle providing means to contain and protect a load for long periods of time.

It is still another object of this invention to provide a transport vehicle having flexible load enclosure means which are inflated by gas under pressure.

It is still another object of this invention to provide a transport vehicle incorporating flexible closure means in which a load can be stored wherein the closure means can be used to assist in the handling of the load.

It is still another object of this invention to provide a transport vehicle incorporating closure means adapted to receive and protect a load for long periods of time.

It is still another object of this invention to provide a transport vehicle having a suspension system which can be adjusted to raise or lower the various portions of the vehicle to permit movement of the vehicle past obstacles.

Further objects and advantages will appear from the following description and drawings, wherein:

FIGURE 1 is a side elevation of a preferred transport vehicle according to this invention wherein the vehicle is supported on the wheels for movement from one location to another;

FIGURE 2 is a view similar to FIGURE 1 showing the position the wheels assume when they are retracted and the vehicle is lowered to the ground for stationary storage;

FIGURE 5 is a fragmentary perspective view of a preferred wheel suspension utilized to support the vehicle;

FIGURE 6 is a fragmentary view partially in longitudinal section of the preferred spring and shock absorber unit of FIGURE 5;

Figure 3:
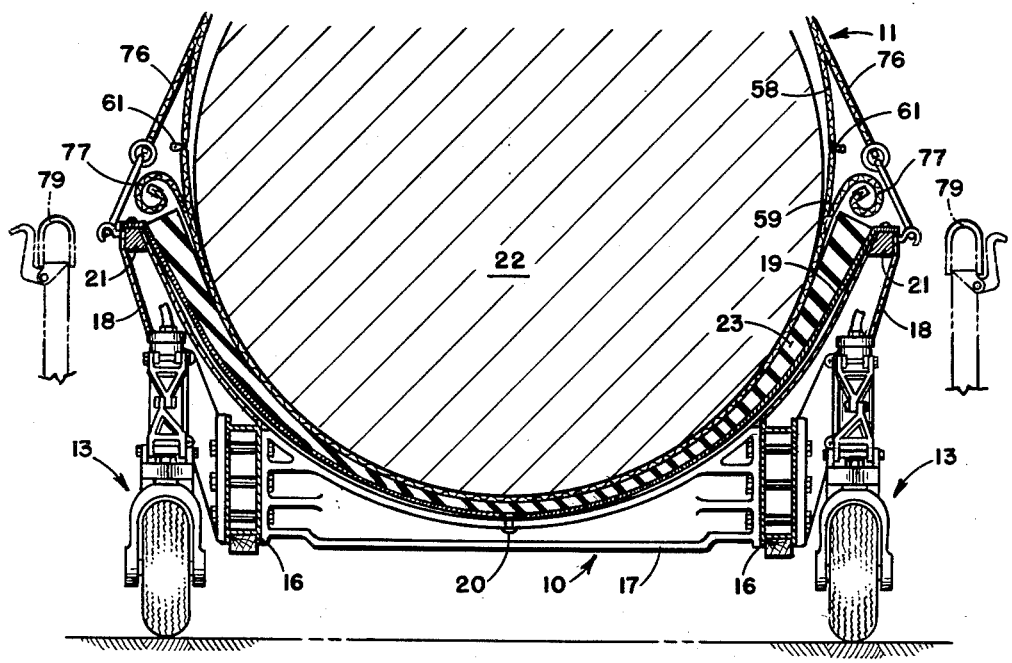
FIGURE 3 is a cross section showing the structure of the transport vehicle including the storage container adapted to receive and protect the load.

Missiles and many other military devices are extremely complicated and susceptible to damage during storage periods unless they are contained within a controlled atmosphere having a very low moisture content. Since such devices are often assembled and then stored for long periods of time while being ready for immediate use it is desirable to combine the storage and transport functions into a single vehicle so that the handling is reduced to a minimum. A transport vehicle according to this invention is suitable to meet the above mentioned needs and also has the flexibility of handling which enables it to be loaded aboard an aircraft in addition to being adapted for use in transportation on the ground.

In FIGURES 1 and 2, the entire transport vehicle is shown which vehicle includes two basic components, namely, the support or frame portion 10 and the load container 11. The frame portion is provided with wheel suspension units 13 which can be extended as shown in FIGURE 1 so that the frame is lifted clear of the ground or retracted to lower the frame to the ground for stationary storage. Tow bars 14 are connected to the frame 10 at either end so that the vehicle can be pulled in either direction. When the vehicle is to be stored in a given place for a period of time, the wheel suspension units 13 can be retracted to lower the frame 10 until it rests on the ground and the wheels are lifted clear of the ground. The two bars 14 can also be raised in a bumper like manner to provide protection for the ends of the container 11.

The frame 10 comprises a longitudinally extending box beam 16 on either side of the vehicle bolted to a plurality of longitudinally spaced cross beams 17. A plurality of cradle support members 18 are bolted to each of the box beams 16 and co-operate with the cross beams 17 to form a circular profile, as best seen in FIGURE 3. A rail 21 extending longitudinally along each side of the frame is welded to the upper ends of the cradle support member 18. A sheet of metal cradle 19 is riveted along its upper edge to rails 21 and is therefore supported along its upper edge throughout the entire length of the frame to provide a semicylindrical base on which a cylindrical load 22 can be supported. The cradle 19 is spaced from the frame excepting along its edges which are riveted to the rails 21 and its center which is riveted to the cross beams at 20. The rivets 20 operate to prevent the cradle from swinging laterally in the frame but any load carried by the cradle 19 will almost entirely be supported by the rails 21 and the metal of the cradle will be in tension. Preferably the cradle 19 is lined with a sheet of resilient material 23 such as foam rubber or the like which provides a resilient padding between the load 22 and the cradle 19. An examination of FIGURE 3 will show the resilient material 23 is compressed along the bottom portion of the cradle 19 by the weight of the load 22, but the unstressed dimensions are arranged so that the resilient material has a uniform thickness.

Reference should now be made to FIGURES 5 and 6 for the structural details of a preferred wheel suspension unit 13. There are four similar units mounted on the frame 10 and each unit is provided with one or more ground engaging wheels 24. In the embodiment disclosed, there are two wheels for each suspension unit arranged in a tandem relationship. Since all of the wheel suspension units 13 are identical, the structural details of only one will be discussed. The wheel suspension unit includes a fluid spring having a cylinder 26 formed with laterally extending ears 27 through which the cylinder is fastened to the beam 16. A piston 28 extends through the lower end of the cylinder 26 and is axially movable relative thereto. Pivotally mounted on the lower end of the piston 28 by a pivot pin 29 is a wheel support beam 31. The wheel support beam 31 projects forwardly and backwardly from the piston 28 and has a wheel mounting fork 32 mounted on each end thereof. Each fork embraces a wheel 24 which is journaled thereon. The connection between the mounting fork 32 of the support beam 31 can permit pivotal movement therebetween around a vertical pivot axis 33. It is normally desirable to provide lock pins which could be put in place to prevent the pivotal movement of the wheels 24 around the axis 33 when the vehicle is to be moved in a straight direction. Connected between the cylinder 26 and the support beam 31 is one or more pairs of pivotally connected torque arms 34 which permit axial movement of the support beam 31 relative to the cylinder 26 while restraining the former against rotation around the central axis of the cylinder 26.

Referring to FIGURE 6, the cylinder 26 is formed with an axial bore 36 into which the piston 28 projects. The piston 28 is also formed with an axial extending bore 37 along the walls of which slides a floating piston 38. An orifice plate 39 having a central orifice 41 is threaded onto the upper end of the piston 28 and separates a chamber 42 above the floating piston 38 from a chamber 43 in the bore 36 above the orifice plate 39. This piston 28 is provided with a resilient seal 44 which engages the wall of the bore 36 to prevent fluid leakage out of the chamber 43. A gland 46 is positioned in the lower end of the cylinder 26 and is provided with resilient seals 47 which engage the piston 28 and the cylinder 26 and assists in defining an actuating chamber 48 around the piston 28. The gland 46 is held against a shoulder 49 formed in the cylinder 26 by a sleeve bearing 51 which in turn is held in position by a gland nut 52 threaded onto the lower end of the cylinder 26.

A chamber 53 is defined within the bore 37 below the floating piston 38 which is charged with gas or air under pressure through a fitting 54 so that the floating piston 38 is resiliently urged in an upward direction toward the orifice plate 39. Both of the chambers 42 and 43 are filled with liquid under pressure through a charging connection 56. Since liquid in the chamber 43 passes through the central orifice 41 to fill the chamber 42 a single connection 56 is used to fill both chambers. When the pressure in the chamber 42 is higher than the pressure of the air within the chamber 53, the sliding piston 38 moves away from the orifice plate 39 and compresses the air to a pressure equal to the pressure of the liquid. Therefore, the liquid is pressurized by compressed air and produces a reaction force tending to urge the piston 28 downwardly relative to the cylinder 26. When it is desired to raise the one end of the frame 16 it is merely necessary to pump more fluid into the chamber 43 which increases the air pressure within the chamber 53 and in turn increases the liquid pressure causing an increase in the force urging the piston 28 downwardly. By merely admitting the proper amount of liquid into the chambers 42 and 43, a proper static position will therefore be achieved. The chamber 48 is connected to a reservoir return through a pressure hose 57 when the wheels are in the down position. When the wheels hit a bump or the like, the piston 28 moves upwardly causing liquid to flow down through the central orifice 41 which increases the compression of the air in the chamber 53. After this has happened, the piston 28 resiliently returns to its static position so the liquid must flow from the chamber 42 through the orifice 41 into the chamber 43. The flow of the liquid through the orifice 41 in both directions creates damping which prevent unnecessary rebounding of the piston 28.

When the wheel suspension unit is retracted to lower the frame 16 to the ground and lift the wheels 24 it is merely necessary to connect the charging connection 56 to the reservoir return thereby releasing the liquid in the chambers 43 and 42 while supplying liquid under pressure to the chamber 48 through the pressure hose 57. This releases the compression within the chamber 43 and permits the liquid to flow out of the chamber 43 so that the floating piston 38 moves upwardly against the orifice plate 39. When the floating piston engages the orifice plate the force reaction of the air in the chamber 53 is no longer transmitted to the liquid in the chambers 42 and 43 so there is no force reaction urging the piston 28 downwardly and the pressure liquid supplied to the chamber 48 is able to produce a sufficient force to cause the piston 28 to move upwardly relative to the cylinder 26 to lift the wheels 24 off the ground. Those skilled in the art will recognize that the disclosed suspension system enables the operator to raise or lower either end or the entire vehicle. Therefore, the frame can be raised to pass over obstacles or lowered to pass under overhead obstacles. Normally, when the vehicle is transported by air, the frame will be lowered after the vehicle is loaded on the aircraft so that it will not roll in the storage area.

Figure 7:
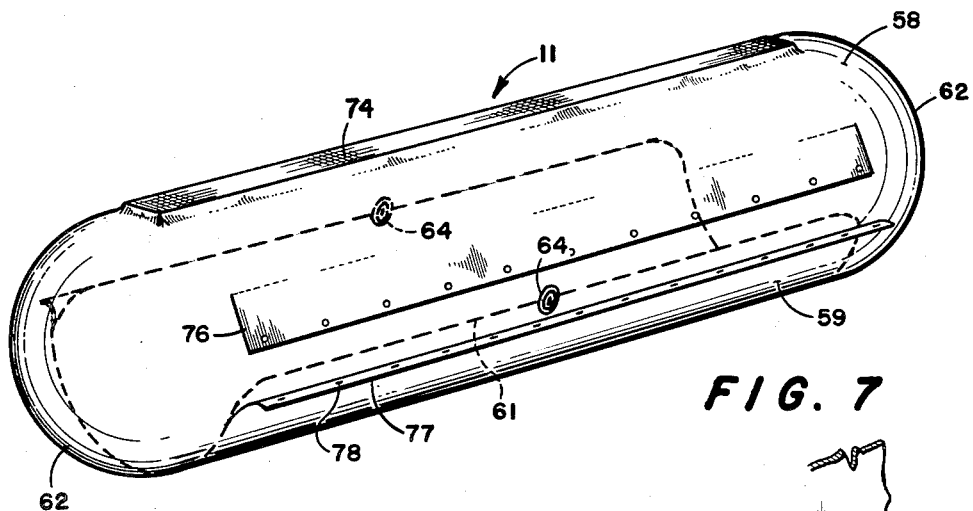
FIGURE 7 is a perspective view of the load container structure.
Figure 8:
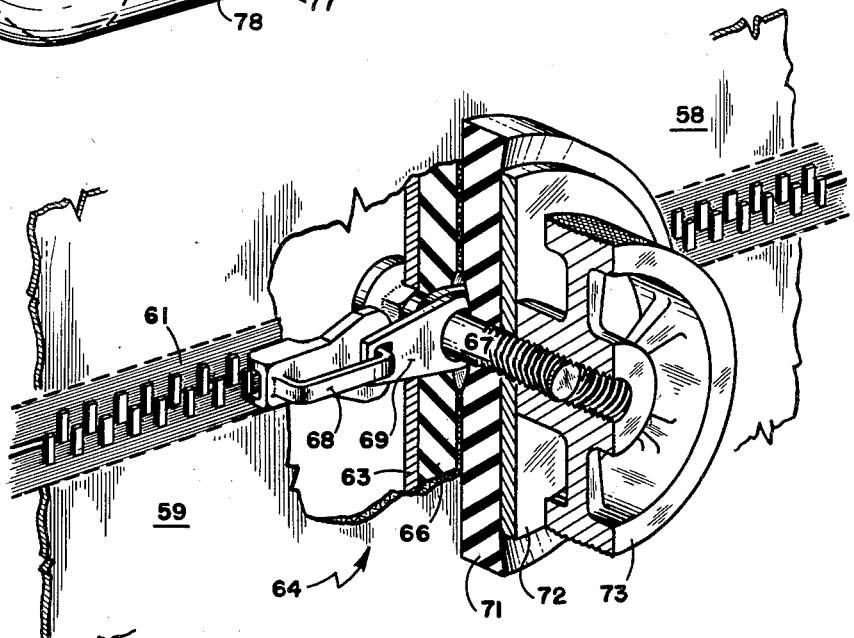
FIGURE 8 is a fragmentary perspective view of the terminal seal utilized to seal the ends of the slide fasteners of the container.
Figure 9:
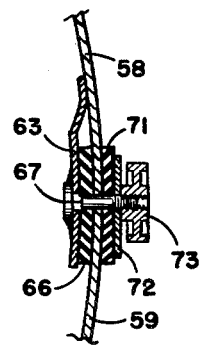
FIGURE 9 is a cross section of the terminal seal showing how it is supported on the container; and, FIGURE 10 is a schematic view of the control mechanisms for controlling the atmospheric conditions within the container.

The container 11 preferably is formed as a bag which can be formed by nylon fabric impregnated with a rubber like material which makes it essentially air tight. The bag is formed of an upper portion 58 and a lower or sling portion 59 which are joined together by a pressure-seal slide fastener 61. The two portions co-operate to form a cylindrical container having a hemispherical end 62. The slide fastener 61 is of the usual well known type, but in order to assure a fluid tight joint between the two portions 58 and 59 of the bag, it is necessary to provide this slide fastener with sealing means. To that end there is provided an inside flap 63, best shown in FIGURE 9, which is fastened to the upper bag portion 58 and extends the full length of the edge thereof. This flap, which is preferably made of rubber, extends beyond the edge of the bag portion so that when both portions are fastened, it constitutes a flap covering the fastener which is urged into tight sealing engagement with the slide fastener 61 by pressure within the container so that the gas contained therein will not leak out through the slide fastener. Preferably, we utilize two slide fasteners 61 which terminate on opposite sides of the container 11 at 64. To prevent leakage at the ends of the slide fasteners 61 we provide a terminal seal which includes a disk 66 mounted on the flap 63 on the inside of the container and threaded stud 67 projecting laterally between the edge of the two portions 58 and 59. The slide 68 is provided with a locking tab 69 which fits over the stud 67 to hold the slide 68 and an outer disk of a resilient sealing material 71 fits over the stud 67 and is pressed against the disk 66 by a washer 72 and a nut 73 which is threaded onto the end of the stud 67. This structure not only locks the slide 68 but provides a fluid seal for the ends of the slide fastener 61 to prevent leakage of gas out of the container 11. The container is normally pressurized by a mechanism described below to a pressure in the order of 2 p.s.i. so that the container assumes the shape of FIGURE 7 and is not in contact with the load 22. To this end the container 11 should be sufficiently larger than the load 22 to provide a clearance 70 between the container and load. This is illustrated in FIGURE 3 wherein the load 22 is in contact with the container 11 only along the bottom half thereof. Even with small pressure in the order of 2 p.s.i. the container 11 provides a great deal of protection to the load 22 since objects accidentally dropped on the container will bounce off and even a hammer dropped from a substantial height will not cause the container to deflect in against the load. Because the internal pressure acts on a large area, a relatively rigid structure results which can easily support the weight of a man so a walkway 74 is provided along the top of the container 11 along which service personnel can walk without damaging the container. The upper portion 58 can be formed with tie downs 76 shown in FIGURE 3 which helps secure the closure on the frame 10. When access to the load is desired it is merely necessary to open the fastener 61 and manually slip the upper portion 58 out over the ends of the load 22 and remove it. Because the container is formed of rubberized fabric, even large pieces such as the upper portion 58 can be handled by a few men.

Figure 4:
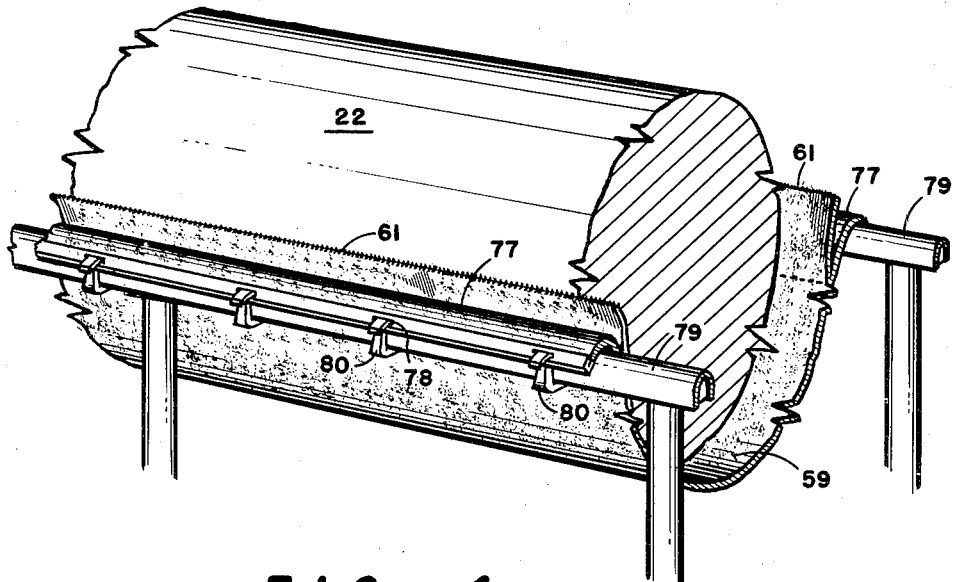
FIGURE 4 is a fragmentary perspective view illustrating how the load can be supported by the closure structure while being placed on the vehicle or removed therefrom with the upper portion of the container removed to give access to the load.

With the preferred structure it is easy to remove the load 22 from the frame 10. For the purpose we provide support rails 79 which can be positioned along either side of the frame by any suitable means. If the support rails are to be used for storage or to hold the load while it is being serviced they can be stationary and mounted on a support structure of any suitable type. The lower portion 59 is preferably formed with lifting flaps 77 provided with reinforcement eyelets 78 so that the load 22 can be removed from the frame 10. For such removal it is merely necessary to release the tie downs 76 and secure the lifting flaps 77 to a longitudinal support rail 79 on either side of the container 11. The eyelets 78 are then fastened to hooks 80 so that the lifting flap 77 is attached to the rail 79. At this time the frame 10 can be lowered as previously described or the rail 79 can be raised and the load 22 will be supported in the container 11. If the lifting flap 77 is formed on the outside of the lower portion or sling 59, the load 22 can be lifted while it is still enclosed within the container. If it is desirable to open the container, it is merely necessary to unzip the slide fastener 61 and lift away the upper portion 58 thereby giving access to the load 22 while the load is supported on the frame 10 or while the load is supported on the rails 22, as shown in FIGURE 4.

If the load 22 within the container 11 requires a controlled atmosphere, a control system shown in FIGURE 10 can be mounted on the frame 10 and utilized to maintain the proper pressure and humidity therein. The container 11 is connected to the pressure side of a blower 81 so that gases exhausting from the blower enter the container at one end through a passageway 82 which in practice may be a conduit made as an integral part of the bag. The inlet side of the blower 81 is connected to the other end of the container through a passageway 83 in which is installed the various sensing and gas treating devices. Therefore, the blower 81 operates to circulate gas from one end of the container to the other and then through the gas treating and sensing devices. After the gas leaves the container, it first passes a dump valve 84 which is normally closed and can be opened to exhaust gas from the system. The gas then passes by a relief valve 86 which is normally closed but adjusted to automatically open when the pressure within the container goes above a predetermined maximum.

In the illustrated embodiment, the relief valve will be set to open at pressures slightly greater than 2 p.s.i. The gas then passes a pressure gauge 87 which gives a visual indication of the pressure within the system. Next, the gas passes a high and low pressure operated electric switch 88 which turns on a warning light or signal 89 whenever the pressure within the system exceeds a predetermined maximum or goes below a predetermined minimum. Following the pressure switch 88 is a hygrometer 91 which gives a visual indication of the humidity of the gas circulating through the passage 83. Following the hygrometer 91 is a humidistat 92 which closes an electrical circuit to a solenoid valve 93 when the humidity of the gas leaving the container exceeds a predetermined value. The solenoid 93 is normally opened and is closed by the humidistat when the humidity is excessive and thereby diverts the gas flowing through the passage 83 through a parallel passage 94 which bypasses the solenoid valve and contains a canister 96 having a chemical drying agent. Manual shut-off valves 97 may be provided in the passage 83 on either side of the canister 96 so that the system can be isolated from the canister when it has to be replaced or regenerated. Those skilled in the art will recognize that when the humidity exceeds a predetermined maximum, the gas will flow through the drying canister 96 wherein the excessive moisture will be removed. The gas then passes into the inlet of the blower 81 and is then recirculated through the canister 96.

If extremely low humidity is to be maintained in the container, or if it is desired to use a simplified system, it would be merely necessary to pass the recirculated air through the canister at all times and thereby automatically remove any excessive moisture without necessitating the use of the humidistat 92 and the solenoid valve 93.

The warning light or signal 89, the humidistat 92, solenoid valve 93, and the blower 81 can be operated from a battery electrical source 98 so that the vehicle is completely self-contained. For long periods of storage, it would normally be desirable to use external power source connected at 99. If the proper voltage were maintained by the external power source, such a system would automatically recharge the battery during the storage period. A visual indication of the operation of the humidistat can be given by a humidity warning light or signal 101, which is connected in parallel with the solenoid valve 93. Because rubberized fabrics of the type contemplated to form the container 11 are slightly permeable, and since the humidity within the container is maintained substantially below the atmospheric humidity there will be a tendency for moisture to permeate the container 11. It is therefore necessary to provide the above mentioned dehumidification system.

In normal operation, the blower 81 would be operated periodically for a period long enough to give a true sample of the conditions within the container 11 by an automatic timer 102. The timer 102 should be set to normally shut off the blower after a predetermined length of time, but the system should be arranged so that the blower 81 will continue to run if the humidistat 92 has operated due to the excessive humidity. Therefore, the blower should be connected in parallel with the solenoid valve 93 and humidity warning light 101 so that the blower will continue to operate until the humidity within the container 11 has reduced below the predetermined maximum. The details of the various electric connections are not discussed because they would be conventional to those skilled in the art, but a schematic connection is shown by the lines 105 which represent the wiring.

In FIGURE 10, a system is shown wherein a reservoir 103 is connected to the passage 83 through a pressure gauge 104, a manual shut-off valve 106, and a differential pressure regulator 107. The reservoir 103 can be charged with an inert gas such as nitrogen or the like if such an atmosphere is required. The differential pressure regulator 107 should be set so that the gas leaving the pressure regulator is always above the atmospheric pressure by the desired amount for the system which in the illustrated case is 2 p.s.i. Therefore, if leakage occurs, the gas will automatically be replenished to maintain it at the desired pressure. Since the container and control system is always maintained at a predetermined gauge pressure above atmospheric pressure, any leakage will be in an outward direction and polution of the system will not take place. Even if leakage is not troublesome, it is necessary to replenish the gas within the system and container whenever the vehicle is transported by air, since the relief valve 86 will release gas as the container moves to the lower atmospheric pressure which occurs at higher altitudes. It is to be noted that the absolute pressure within the container 11 is unimportant but rather the container must always be maintained at a positive predetermined gauge pressure above the atmospheric pressure surrounded in the container. Therefore, as the aircraft descends into more dense atmosphere, it is necessary to supply make-up gas to replace the gas released by the relief valve 86. If the load 22 is such that it can tolerate an atmosphere within the container 11, which is composed of dry air, the reservoir 103 can be eliminated and a blower having a capacity of compressing the atmosphere air to the desired pressure of the container can be substituted therefor. This blower could be operated by the pressure switch 88 whenever the pressure within the container drops below a predetermined minimum.

Those skilled in the art will recognize that a transport vehicle according to this invention will provide easy handling and safe storage for any type of load which must be contained within a controlled atmosphere. The use of a fabric container minimizes the difficulty of opening or closing the container to obtain access to the load and in addition can be used as a sling to move the load into or out of the frame of the vehicle.

Although the preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed descriptions are determinative of the scope of the invention.

We claim:

A closed circuit pressurizing system for a fluid tight load receiving container, a blower having inlet and pressure sides, pressure conduit means connecting the pressure side of said blower to said container to supply gas under pressure to said container, inlet conduit means connecting said container to the inlet side of the blower for returning gas from said container to said blower, a relief valve connected to said inlet conduit means for exhausting gas from the container when the pressure of the gas exceeds a predetermined maximum, a reservoir containing gas under pressure, conduit means connecting said reservoir to the inlet conduit means to supply make-up gas thereto, a pressure regulator in the last said conduit means to control the supply of gas from said reservoir when the pressure of the gas in the container drops below a predetermined minimum, gas drying means for the circulated gas, conduit means connecting said gas drying means in parallel with the inlet conduit for diversion of the flow of gas from the inlet conduit means through the gas drying means and returning the gas to the inlet conduit, moisture sensing means in the inlet conduit means for sensing the moisture in the circulated gas, valve means in the inlet conduit means operative to divert the flow of gas from the inlet conduit means to the gas drying means, and means connecting said valve means to the moisture sensing means to operate said valve means in response to the moisture content of the gas as sensed by the moisture sensing means.

References Cited in the file of this patent

UNITED STATES PATENTS

| | | |
|---|---|---|
| 2,089,776 | Wittmann | Aug. 10, 1937 |
| 2,350,883 | Duttweiler | June 6, 1944 |
| 2,439,793 | Braddon | Apr. 20, 1948 |
| 2,465,162 | Lockwood | Mar. 22, 1949 |
| 2,485,522 | Andersen | Oct. 18, 1949 |
| 2,496,862 | Del Mar | Feb. 7, 1950 |
| 2,549,672 | Del Mar | Apr. 17, 1951 |
| 2,549,690 | Klemperer | Apr. 17, 1951 |
| 2,569,537 | Robbins | Oct. 2, 1951 |
| 2,649,671 | Bartelt | Aug. 25, 1953 |
| 2,717,017 | Feasey | Sept. 6, 1955 |
| 2,731,055 | Smith | Jan. 17, 1956 |
| 2,767,943 | Janney et al. | Oct. 23, 1956 |
| 2,776,146 | Marino | Jan. 1, 1957 |
| 2,797,928 | Blubaugh | July 2, 1957 |

FOREIGN PATENTS

| | | |
|---|---|---|
| 166,702 | Switzerland | Jan. 31, 1934 |